United States Patent [19]

Halaby, Jr.

[11] 4,272,019
[45] Jun. 9, 1981

[54] FLUID SPRAYER APPARATUS AND METHOD

[76] Inventor: Samuel A. Halaby, Jr., 276 Thornell Rd., Pittsford, N.Y. 14534

[21] Appl. No.: 952,107

[22] Filed: Oct. 17, 1978

[51] Int. Cl.³ .................. B05B 7/30; B05B 15/08; B65D 41/32; F16L 37/28

[52] U.S. Cl. .......................... 239/8; 141/351; 222/70; 239/69; 239/70; 239/77; 239/345; 239/351; 239/587; 285/DIG. 15

[58] Field of Search ................ 137/271, 624.11; 222/70, 545, 567; 285/DIG. 15; 220/257; 239/69, 70, 77, 345, 351, 369, 377, DIG. 14, 1, 8, 587; 141/207, 367, 346–362, 382–386

[56] References Cited

U.S. PATENT DOCUMENTS

| | | | |
|---|---|---|---|
| 2,057,434 | 10/1936 | Jaden et al. | 239/DIG. 14 X |
| 3,440,434 | 4/1969 | Yates et al. | 239/70 X |
| 3,587,978 | 6/1971 | Rollow, Jr. et al. | 239/70 X |
| 3,963,178 | 6/1976 | Collins | 239/77 X |
| 4,095,713 | 6/1978 | Norton | 220/257 X |
| 4,116,385 | 9/1978 | Waldron | 239/77 |

FOREIGN PATENT DOCUMENTS

| | | | |
|---|---|---|---|
| 816582 | 7/1969 | Canada | 285/DIG. 15 |
| 2141249 | 3/1972 | Fed. Rep. of Germany | 285/DIG. 15 |
| 7505881 | 12/1976 | Netherlands | 285/DIG. 15 |

Primary Examiner—Andres Kashnikow
Attorney, Agent, or Firm—Schovee & Boston

[57] ABSTRACT

An apparatus and method for the controlled, intermittent, automatic dispensing of atomized fluid, such as an insecticide, into a use area, such as a barn, characterized in that the apparatus and its method of use are controlled to dispense fluid approved for use in the particular use area and supplied from an approved container provided with a vented fluid outlet and dispenser having a code cooperating with a code of a fluid inlet and dispenser means associated with the apparatus. The code includes mating key chambers and key pins arranged in a selected code for a selected approved fluid.

53 Claims, 6 Drawing Figures

FLUID SPRAYER APPARATUS AND METHOD

TECHNICAL FIELD

This invention relates to apparatus and method for spraying atomized fluid.

Particularly it relates to a fluid sprayer apparatus which is programmable especially for intermittent automatic delivery of atomized fluid into the atmosphere of a use area for a selected duration of time at a selected frequency of delivery from at least one substantially universally adjustable fluid atomizing spray head.

More particularly, it relates to a fluid supply means associated with the apparatus comprising in combination a coded fluid inlet and dispensing means having attachment means for attaching the inlet of said means to the outlet of a companion vented coded fluid outlet and dispensing means associated with a container of fluid to be atomized.

The invention further relates to a method of controlling delivery of a fluid into a use area from a fluid sprayer apparatus by restricting use of the apparatus to fluid approved for use in the use area and supplied in an approved container having a vented coded fluid outlet and dispensing means corresponding to the same code as that of a coded fluid inlet and dispensing means associated with the apparatus.

BACKGROUND OF THE PRIOR ART

A portable fluid spray apparatus adapted for operational attachment to standard size containers of insecticide is described in Halaby, U.S. Pat. No. 3,136,487, issued June 9, 1964.

SUMMARY OF THE INVENTION

Delivery of atomized fluid into a use area, for example a cattle milking barn, is a well-known practice. Such delivery, or spraying, can be done on an as-needed frequency or on a programmed frequency using manually operated switches or automatically operated switches and timing devices. The direction of spraying can be controlled manually or automatically to cover a particular area.

The present invention provides an apparatus which has at least one, and preferably at least two, spray heads which can be manually adjusted to direct a stream of atomized fluid into a particular direction, or into at least two directions simultaneously, with two spray heads, using a suitable type of timing means to actuate and shut off an air blower which provides air to aspirate and atomize fluid to be sprayed from a container of fluid. The container of fluid, the blower, connections between the container and the spray head, or heads, and the timing means are preferably and conveniently assembled into a wall-mountable case with the spray heads outside the case. The case and apparatus can also be hung from the ceiling or placed in position as a portable unit.

A significant problem encountered in spraying atomized fluids into an atmosphere which is breathed by humans or animals, or which comes into contact with food products and materials coming in contact therewith, is that environmental control conditions and human safety factors have now become stricter than they have been in the past. Therefore, fluids used in such atmospheres and around humans or animals must meet stricter standards now set by various government agencies as to type and quantity of fluid that may safely be used.

The present invention provides a fluid sprayer apparatus comprising coded fluid delivery means for permitting only approved fluid to be dispensed by the apparatus for use in a particular area to be sprayed with the approved fluid. The coded means comprises coupling means associated with the outlet of an approved fluid container and the fluid intake means of the apparatus.

The fluid sprayer apparatus preferably comprises the coded fluid delivery means, at least two substantially universally adjustable spray heads, fluid conduit means connecting the coded fluid delivery means with the spray heads, an air blower provided with a motor for driving the blower, conduit means for delivering air from the blower to the spray heads, a metered nozzle in each spray head for controlling flow of fluid from the fluid conduit means into air in the spray head, and automatic programmable timing means for actuating said motor and timer from a source of energy to cause the fluid to be atomized and sprayed into the atmosphere.

The invention further comprises a method for controlling dispensing of a fluid into a use area from a fluid sprayer apparatus comprising restricting use of the apparatus to fluid approved for use in the use area by supplying approved fluid in a container having a vented coded fluid outlet and dispensing means including keying means adapted to mate with keying means of a coded fluid inlet and dispensing means associated with a fluid conduit line connected with a nozzle of the spray head of said apparatus, and connecting said coded fluid outlet and dispensing means of said container to the coded fluid inlet and dispensing means associated with said fluid conduit line prior to dispensing said fluid.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 1 is a front elevational view of an embodiment of the invention showing the general arrangement of the elements.

FIG. 2 is an enlarged elevational cross-sectional view of a spray nozzle assembly.

FIG. 3 is a slightly enlarged top view of a spray head taken along the line 3—3 of FIG. 2.

FIG. 4 is a front elevational view partially in cross-section of the area A shown within the dashed line in FIG. 1 and shows the assembled coded fluid delivery means 29.

FIG. 5 is a front elevational view of the coded fluid dispensing means 33 with a detachable cap indicated in dashed lines before detachment and after detachment.

FIG. 6 is a plan view taken along the line A—A of FIG. 4 and illustrates a preferred embodiment of a coding means.

DETAILED DESCRIPTION OF THE INVENTION

Referring now to the drawings, FIG. 1 shows a case 1 having a front opening from which the front cover (not shown) has been removed. Case 1 comprises a bottom panel 47, a top panel 49 and side panels 51 and 53. The panels can be of metal or other rigid or semi-rigid material such as plastic. Extending through the top panel 49 of case 1 are a pair of removable and adjustable spray nozzle means 3 and 5 having spray heads 7 and 9, respectively. Each spray head has a detachable metered spray nozzle 11 and 13, respectively. A rack 15 is attached to panel 47 and holds an array of nozzles 17 of a variety of flow sizes for interchange with nozzles 11 and 13, for providing different flow rates as desired. Fluid conduit lines 19 and 21 are connected at their outlet ends to nozzles 11 and 13 respectively and are connected at their inlet ends to inlet ends of a tee connector 23 which may be attached to back panel 43 and in turn has its inlet end connected to a common fluid conduit line 25. Fluid conduit lines 19, 21 and 25 can be made of flexible metal tubing such as copper tubing. Preferably, the fluid conduit lines are made of a fluid resistant synthetic polymer, such as polyolefin, e.g. polyethylene or polypropylene. The tee connector 23 can be made of similar metal or polymer material, preferably polymer material. When conduit line 25 is made of a polymer, the line preferably is encased in a metal or other protective casing, not shown, to protect the line from damage or pinching.

Fluid line 25 preferably is held in place on back panel 43 by a fastener 61. Fluid conduit line 25 has an inlet end connected to a coded fluid delivery means 29 indicated within the dashed line area A of FIG. 1 and shown in greater detail in FIG. 4.

A container 27 of fluid to be atomized is detachably attached in inverted position by its outlet 31 to a container outlet engaging first coded fluid dispensing means 33 which is provided with vent means and which is engaged in a keyed, air and fluid tight position with a second coded fluid dispensing means 35.

Figure 4:
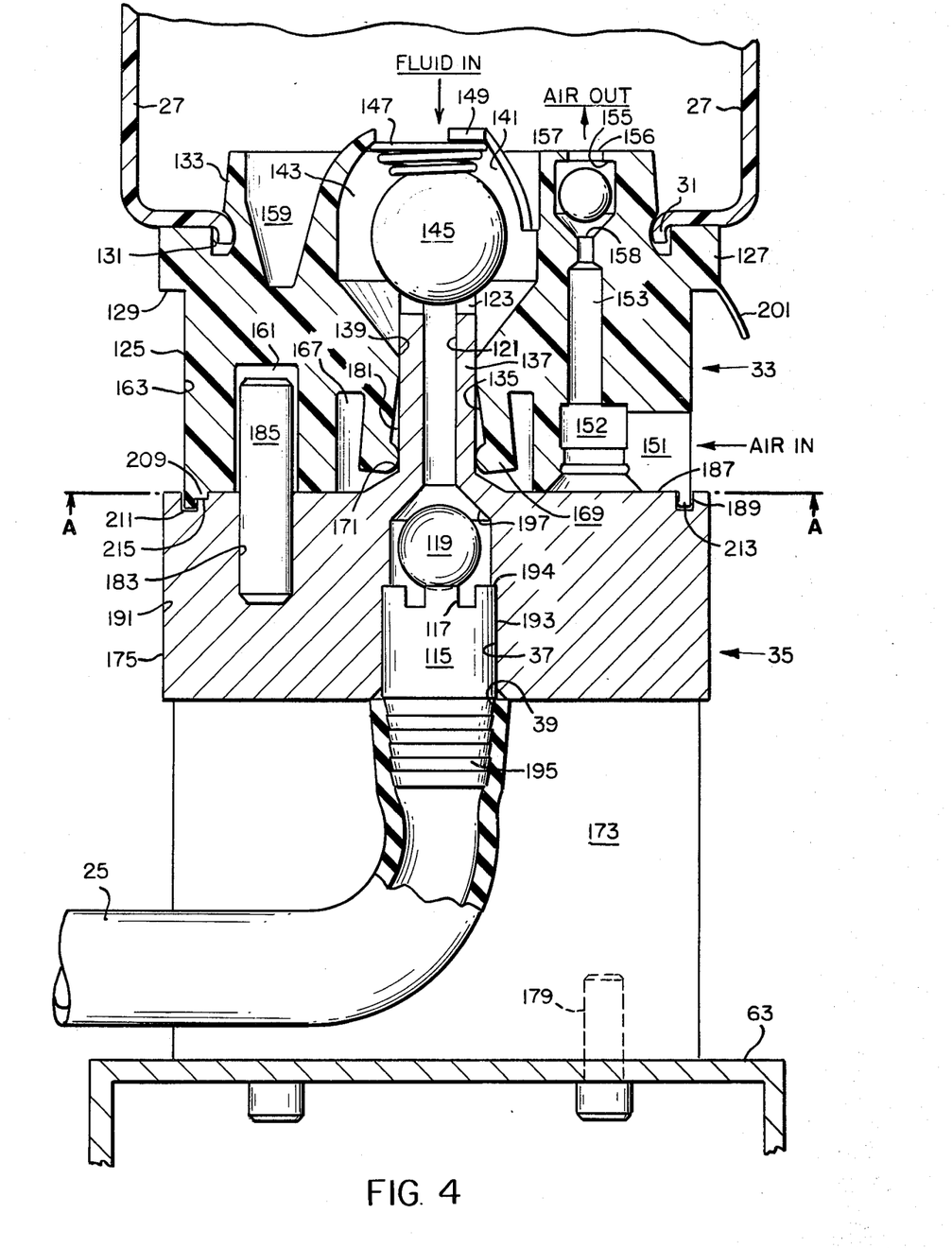

The outlet 37 of means 35 is connected to the inlet end 39 of fluid conduit line 25, as best seen in FIG. 4. Container 27 is preferably secured in place by a strap means 27-a attached to side panel 53. The coded fluid delivery means 29 is supported on a support bracket 63 attached to bottom panel 47 of case 1. It can also be mounted directly on panel 47 and bracket 63 can be used to support the container by passing its neck through bracket 63.

A motor driven air blower 41 encased in a metal casing with air intake openings in the bottom end is securely mounted to the back cover 43 of case 1 by bracket 41-a. A timer and controller means 45 is securely mounted to back cover 43 and may be supported by bottom panel 47 of case 1. The means 45 is provided with an Underwriters Laboratories approved electric cord 55 having a three prong grounded connector 57 which can be plugged into an outlet from an AC or DC source of electricity, not shown.

The motor 41-b of the blower 41 (shown by dashed lines along with the blower fan 41-c) can be either an AC or DC motor or a combination AC-DC power. Preferably, it is a 110–120 V AC-DC, 9/16 h.p., 17,500 r.p.m. motor. A 220–230 V AC-DC motor also can advantageously be used when the higher voltage source of electricity is available for use. The motor 41-b of blower 41 is connected by electrical line 59 to an output connector from the timer and controller means 45.

Figures 2, 3:
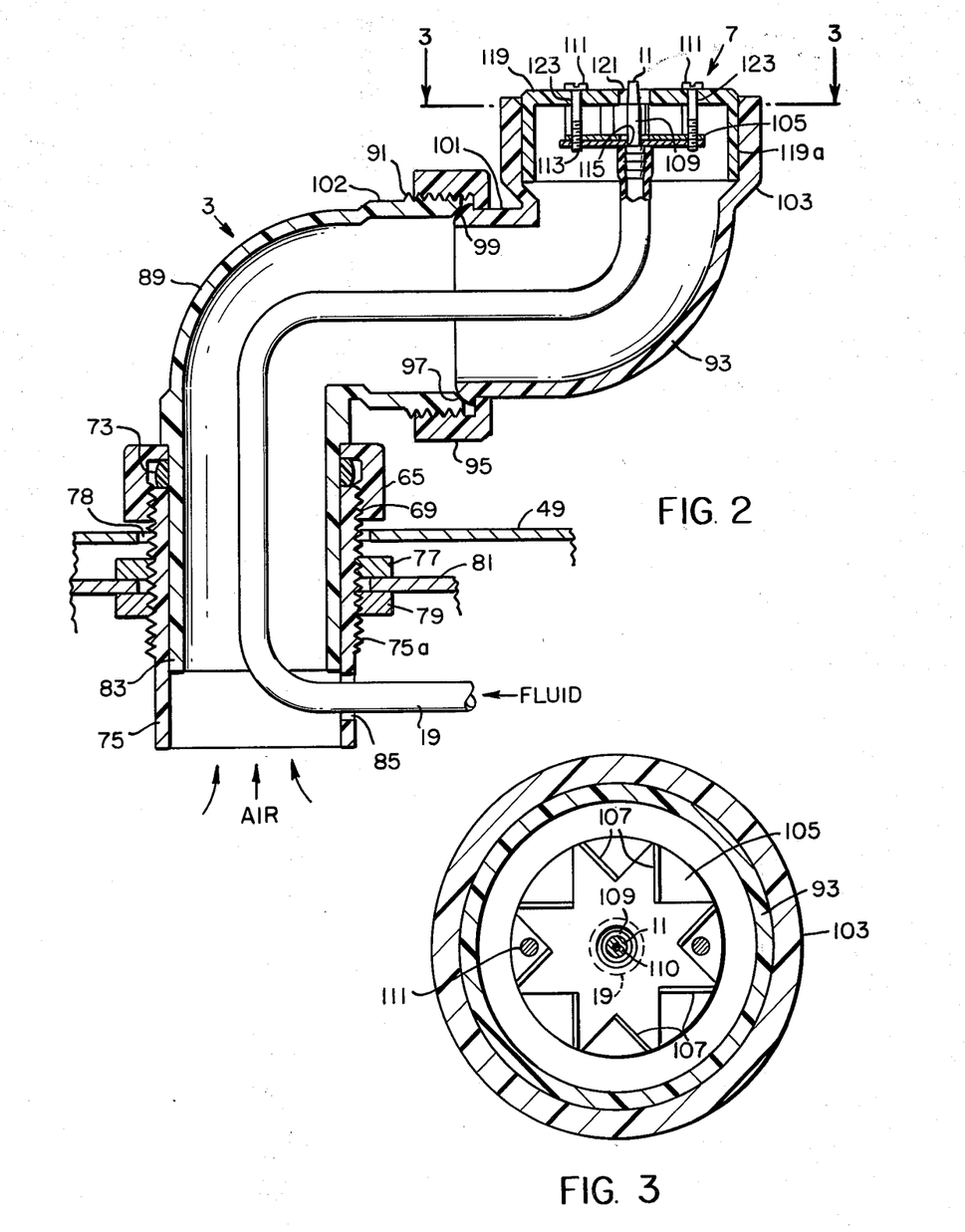

FIG. 2 shows in greater detail the elements of spray nozzle means 3, the connections between means 3, blower 41 and conduit lines 19. The elements of spray nozzle means 5 are identical to those of spray nozzle means 3 as are the connections between spray nozzle means 5 and blower 41 and conduit line 21.

Figure 1:
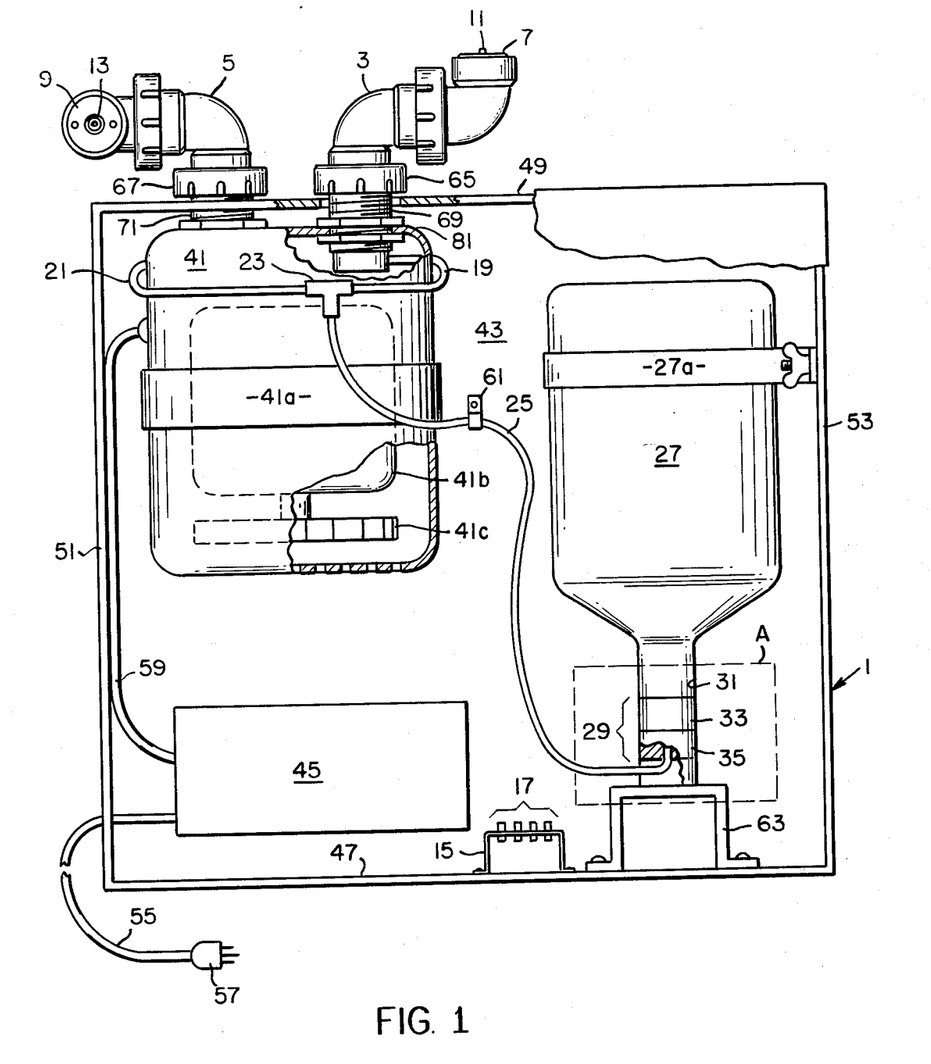

Referring to FIGS. 1 and 2, the pair of spray nozzle means 3 and 5 are provided with adjustable coupling means 65 and 67 respectively for coupling means 3 and 5 respectively to each of a pair of air outlet means 69 and 71 extending upwardly from the top of blower 41, each provided with male threads and a sealing gasket 73.

Referring more specifically to FIG. 2, FIG. 2 illustrates a preferred embodiment of the universally adjustable spray nozzle means 3. The description of spray nozzle means 3 made with reference to FIG. 2 is to be understood to apply also to that of spray nozzle means 5. In FIG. 2, 69 is a slip joint means having a tubular sleeve 75 extending through an opening in top plate 81 of blower 41. Tubular sleeve 75 is coextensive with a threaded flange having extended male threads 75-a. A pair of lock nuts 77 and 79 secure slip joint means 69 to top plate 81. Tubular sleeve 75 preferably is provided near its lower end with an opening 85 through its wall through which fluid conduit 19 passes and by which it is supported out of contact with moving or hot parts of the blower 41 and motor 41-b.

Spray nozzle means 3 includes a first 90° elbow 89 having an extended tubular part 102 having a male thread 91 at its open end and having an extended tubular part 83 having an open end and provided with a nut 65 with a female thread. Spray nozzle means 3 also includes a second 90° elbow 93 having a tubular part 101 provided with an inlet end and provided with a ball joint flange 97 adapted to fit into a ball joint recess 99 of tubular part 102 of elbow 89. A nut 95 with female threads is fitted over tubular part 101.

The outlet end of elbow 93 is provided with an outlet head retainer 103 having inner and outer diameters greater than those of the outer diameter of elbow 93.

FIG. 3 which is a section of FIG. 2 taken along the line 3—3 best illustrates the assembly of the various parts of spray head 7 of spray nozzle means 3. In FIG. 3 and section 3—3, 105 is an air distributor plate with a multiplicity of raised air vanes 107. Nozzle 11 is threaded into threaded fitting 109 which is press-fitted into opening 115 of plate 105 and is provided with a fluid conduit 110 from which atomized fluid is formed upon mixing with air aspirated around and over plate 105 and vanes 107. Fitting 109 extends below plate 105 a distance sufficient to permit fluid conduit line 19 to be securely fitted to the inlet end of fitting 109. Spray head 7 is provided with a cover plate 119 having a center opening 121 through which air and fluid escape from the spray head 7. Cover plate 119 preferably is cup-shaped and has a radial sleeve part 119-a which extends downwardly and is fitted tightly in elbow 93 within outlet head retainer 103 and is provided with a pair of openings 123 through which a pair of screws 111 pass and screw into a pair of openings 113 in plate 105.

Spray nozzle means 3 is readily assembled for operation by inserting the outlet end of fluid conduit line 19 through opening 85 of sleeve 75 of slip joint means 69 and securing means 69 to top plate 81 of blower 41 with nuts 77 and 79 with blower 41 detached from panel 43. Slip joint means 69 is inserted through opening 78 and blower 41 is mounted securely to panel 43.

The outlet end of conduit line 19 is then passed through elbow 89. Tubular part 83 of elbow 89 is slipped into slip joint 69 and elbow 89 is secured to slip joint 69 by hand tightening nut 65. Fluid conduit line 19 is passed through elbow 93 and is attached to inlet end of fitting 109 of plate 105. Plate 105 is inserted within outlet head retainer 103. Cover plate 119 is placed over air distributor plate 105 and pressed tightly into outlet head retainer 103. Screws 111 are inserted through openings 123 in cover plate 105 and screwed into openings 113 of plate 105 to secure plate 105 in spray head 7. Elbow 93 is then fitted to elbow 89 and nut 95 hand tightened on threads 91 to form a tight seal between ball joint recess 99 and ball joint flange 97.

Fluid conduit line 19 passes from opening 85 to one end of tee 23 and receives fluid flowing into tee 23 from fluid conduit line 25. Fluid conduit line 25 passes up to tee 23 along the outside of blower 41. Tee 23 is preferably located externally of the metal casing around blower 41. The metal casing is provided with at least one opening for conduit lines 19 and 21 to pass to spray nozzle means 3 and 5 respectively.

Referring now to FIG. 4, the assembled coded fluid delivery means 29 is shown in greater detail. Means 29 comprises a first coded fluid dispensing means 33 which is provided with air vent means for a container and which is coupled to a second coded fluid dispensing means 35. The first coded fluid dispensing means 33 comprises a molded plastic body having a cylindrical lower body 125, a cylindrical resilient container latch 127 having a shoulder 129, a radial recess 131 positioned radially inwardly from shoulder 129 and a resilient tapered radial lip 133 which is designed to snap into outlet 31 of container 27 and to form a fluid tight seal therewith. Further, in means 33, 135 is a fluid dispensing outlet having its vertical axis parallel to the vertical axis of body 125 and adapted to receive and retain in fluid-tight engagement mating fluid receiving inlet 137 of the second coded fluid dispensing means 35. Outlet 135 merges at its inlet end 139 with the wall 141 of chamber 143 which is open-end and of generally spherical shape and which retains a ball check valve 145 and a coil spring 147 shown in compressed condition. Ball check valve 145 is supported on the castellated end 123 of fluid receiving inlet 137 of means 35. Coil spring 147 is retained by at least two resilient molded retaining arms 149. The interior wall 141 of chamber 143 preferably is provided with axially extending ribs which serve to guide the ball of ball check valve 145 and strengthen arms 149.

Ball check valve 145 in cooperation with coil spring 147 serves as a check valve to prevent flow of fluid out of the container 27 prior to connecting means 33 in keyed position with means 35 and serves as a closure to stop flow from the container when means 35 is disconnected from means 33.

Also, in means 33, 153 is an air inlet chamber open to the atmosphere by means of a slitted opening 151 at the cylindrical wall of body 125. Adjacent to opening 151 is an opening 152 adapted to receive plug 205 of cap 199, more fully described below with reference to FIG. 5. Opening 152 opens at one end into endwall 187 of means 33 and opens at its other end into opening 153 and together with opening 151 permits air to flow through elongated passageway 153 into open-ended chamber 155 in which is located ball check valve 157. The ball check valve 157 serves as a check valve to stop flow of fluid out of the container 27 and permits air to flow into the container to vent the container when the container is in an inverted position.

In means 33, 159 is a radial recess provided for molding purposes. Further, 209 is a guide pad for orienting means 33 with respect to means 35 which is provided with a recess 215 for mating with guide pad 209 when the means are assembled to form coded fluid delivery means 29. Also, 213 is a radial shoulder against which cap 199, shown in FIG. 5, seats when means 33 is capped.

Also, in means 33, 161 is one of a multiplicity, preferably of at least three, of elongated key chambers radially located in the endwall 187 of and within the body 125 inwardly a suitable distance from its outer wall 163. The key chambers will be more fully discussed with reference to FIG. 6 hereof. Further in means 33, 167 is a radial recess surrounding outlet 135 separated from outlet 135 by a tubular extension 169 of the wall of outlet 135 which expands when means 33 and 35 are mated. Tubular extension 169 is provided with a resilient inner shoulder 171 which forms a seal with the mating fluid receiving inlet 137 of means 35.

The second coded fluid dispensing means 35 comprises a pair of wide support legs 173, one of which is shown in elevation, which support a cylindrical upper body 175 and are secured to a support bracket 63 by fasteners 179, which may be screws or pins or the like. The body 175 and support legs can be made separately of metal or plastic material and fastened together. Preferably, the body and legs are integral with each other. More preferably, the support legs 173 are formed by machining a "U"-shaped channel through the cylindrical walls and one end wall of a solid metal, preferably bronze, cylinder, forming and open "U"-shaped channel of sufficient size to receive fluid conduit line 25 and having sufficient wall thickness to receive the fasteners 179 for mounting the shaped cylinder by its channeled end wall.

The cylindrical upper body 175 includes an elongated cylindrical fluid receiving inlet 137 having an inner cylindrical wall 121 and an outer cylindrical wall 181 radially located around the vertical axis of the cylindrical body 175 and parallel thereto. Body 175 also includes a multiplicity of elongated key chambers 183, preferably at least three, radially located in the endwall 189 of and within the body 175 between its outer cylindrical wall 191 and its inner cylindrical wall 193 and having their vertical axes parallel to that vertical axis of body 175.

The key chambers 183 should, at a minimum, correspond in number to the key chambers 161 of means 33. Preferably, the number of key chambers 183 of means 35 will be greater than that of means 33, as more fully described below. Each key chamber 183 corresponding to a mating key chamber 161 of means 33 is provided with an elongated coding key pin 185 which is securely retained in its respective key chamber 183 and which extends outwardly from endwall 189 of body 175 parallel to the vertical axis thereof for a distance sufficient to fit snuggly into its mating key chamber 161 when means 33 and 35 are connected to each other.

Means 35 also includes an elongated cylindrical fluid outlet 37 having its vertical axis parallel to that of body 175. Means 35 also includes a connector 115 having a castellated fluid inlet end 117 press-fitted into outlet 37 against shoulder 194 thereof and has a fluid outlet end 195. In another embodiment, the connector 115 can be eliminated and fluid conduit line 25 provided with castellations at its inlet 39. Line 25 then can be seated sealingly in outlet 37 and abutting shoulder 194. Also in means 35, 211 is a recess for retaining shoulder 213 of means 33 and recess 215 serves as a positioning guide for assembling means 33 to means 35, mating with guide pad 209.

As shown in FIG. 4, the inlet end 39 of fluid conduit line 25 is connected to outlet 37 of the second coded fluid dispensing means 35 by means of connector 115 which has fluid outlet end 195 inserted into the inlet end 39 of fluid conduit line 25.

Connector 115 can be of metal or plastic, preferably plastic, material. The castelatted end 117 supports a ball which serves as a ball check valve 119 when it is forced by back pressure of fluid against a mating spherical wall surface 197 of means 35. The spherical wall surface 197 merges with inner wall 121 of means 35.

In the assembled coded fluid delivery means 29 shown in FIG. 4, the first coded fluid dispensing means 33 is shown as it appears in assembled form. Preferably, means 33 is made and provided in the cappable form shown in FIG. 5 wherein a cap 199 is provided integral with means 33. Cap 199 preferably is molded of resilient plastic material integral with means 33 and comprises a substantially flat-ended round body formed with a rupturable hinge strap 201 which connects cap 199 with shoulder 129 of container latch 127 of means 33. A notch 214 is provided at the edge of the cap to fit over guide pad 209 of means 33. This embodiment of the invention as shown in FIG. 5 may be referred to as cappable means 233 to distinguish it from means 33 as shown in FIG. 4.

Figures 5, 6:
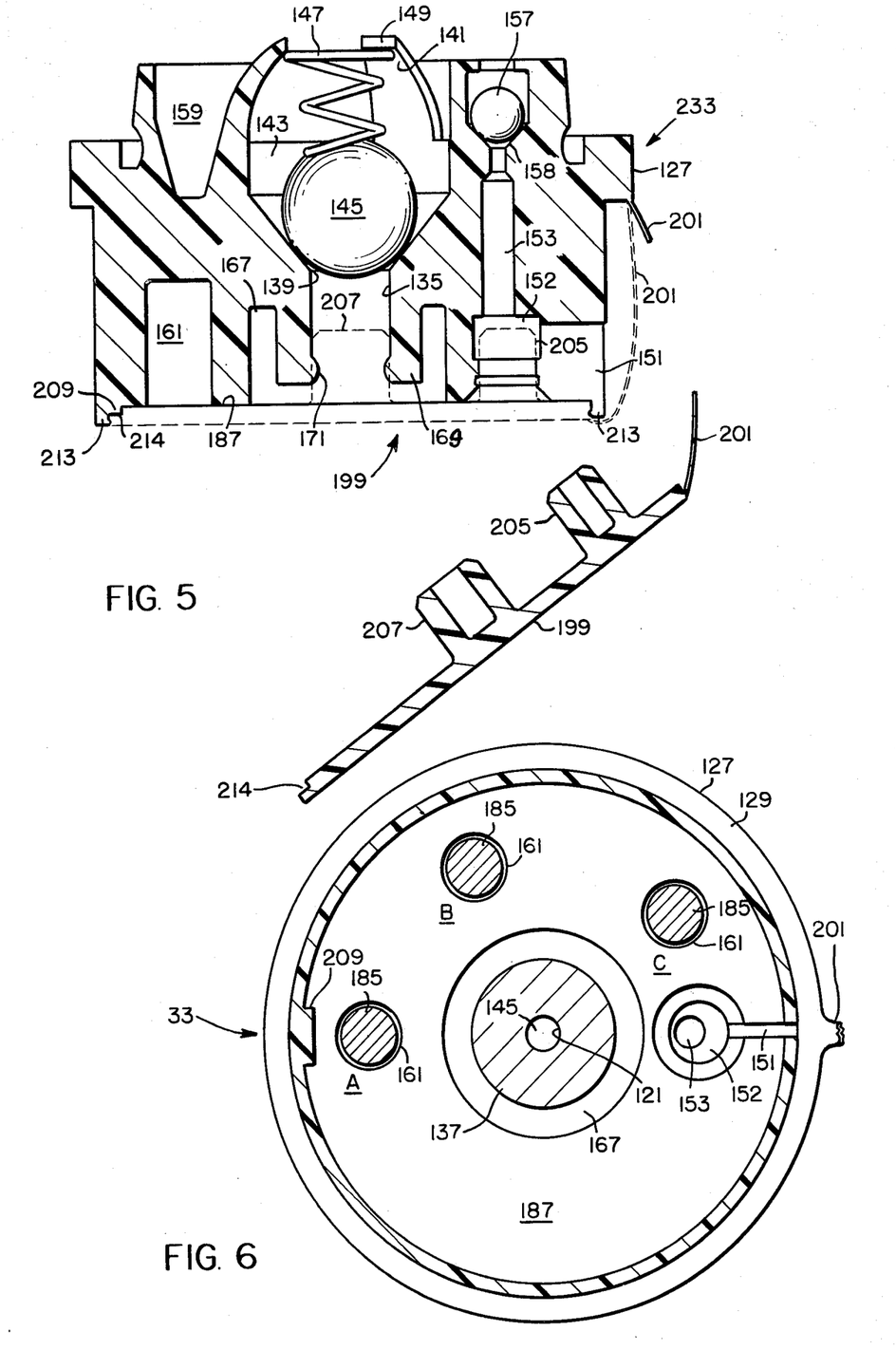

Cap 199 includes a pair of resilient hollow cylindrical plugs 205 and 207 adapted to fit sealingly, as shown in dashed lines in FIG. 5, into opening 152 and fluid dispensing outlet 135, respectively, of means 33 to prevent flow of fluid from a fluid container 27 in which means 33 is inserted and in which the fluid is stored prior to use.

Strap 201 is preferably of a short length so that it is drawn taut when plugs 205 and 207 of cap 199 are inserted into opening 152 and fluid outlet 135, respectively, and the body of cap 199 is seated within shoulder 213 of body 125. The fit between cap 199 and shoulder 213 is preferably made a snap fit forming a locking means which is childproof and cannot readily be removed by children. The strap is preferably made short and taut so that the cap cannot be removed without rupturing the strap. In this way the contents of a fluid container to which the capped means 33 is attached is made tamperproof against adulteration.

At the time the container 27 is to be connected to the fluid sprayer apparatus as shown in FIG. 1, hinge strap 201 can be ruptured and cap 199 then can readily be removed and detached from means 33, leaving only a portion of hinge strap 201 still attached to means 33 as shown in FIG. 4. If desired, particularly if the fluid container is to be removed from the apparatus for any reason, the detached cap may be retained and used as a removable cap.

Prior to assembly of means 233 with means 35, ball check valve is seated against the spherical wall 141 of chamber 143 and held in seated position by spring 147 as shown in FIG. 5, thereby sealing inlet 139 to fluid outlet 135. Also, when container 27 is in an upright position, ball check valve 157 is seated in the outlet 156 of chamber 155, thereby preventing air from entering the container.

During assembly of means 33 with means 35, as the elongated cylindrical fluid receiving inlet 137, or male member, of means 35 is inserted into the fluid dispensing outlet 135, or female member, of means 33, the castellated end 123 of the male member seats against the ball check valve 145 and causes the ball check valve to compress spring 147. As the ball check valve disengages from the spherical valve seat 139, fluid from the container 27 is provided with a passageway from the container, around ball check valve 145, through the castellations of male member 137, along inner wall 121, around ball check valve 119, through the castellated end 117 of connector 115 and through connector 115 into fluid conduit line 25. In FIG. 5, spring 147 is shown in expanded form. Ball check valve 157 seats into the inlet 158 of chamber 155 when means 33 is in operative position in an inverted container.

The coding means associated with means 33 and 35 are best illustrated by reference to FIG. 6 which is a view taken along the line A—A of FIG. 4. In FIG. 6, each of 161 is a key chamber of means 33 and each of 185 is a key pin 185 of means 35. A code can be formulated by identifying each combination of a respective key chamber 161 and its mating key pin 185 with a symbol, for example A, B and C as shown in FIG. 6, for each pin and chamber combination. The pin and chamber combinations A, B and C can be located at any suitable areas of the facing ends 187 and 189 of means 33 and 35 respectively. They can be located symmetrically with the center of each combination positioned on the perimeter of a circle having a radius less than the radius of the body 125 of means 33, substantially as shown in FIGS. 4, 5 and 6. Preferably, each pin will be of the same shape and length, e.g. cylindrical, rod form, and each chamber will be of the corresponding receptable shape and length. Each pin and chamber combination will be equally spaced on the perimeter of the circle. The pin and chamber combinations can also be arranged asymmetrically anywhere in the end walls 187 and 189 where they can be mated without interfering with fluid flow or attaching means.

The number of chambers 161 in means 33 can vary from 2 to 12 or more, and the number of chambers 183 and pins 185 in means 35 can vary accordingly. However, means 33 preferably should always have no more chambers than the number of key pins provided in means 35 so that the means 35 cannot be assembled to a non-approved container of fluid. For example when means 35 has 2 cylindrical pins 185, the two pins can be located in two chambers 183 of means 35 in locations corresponding to any of a multiplicity of combinations of the two pins with chambers 183. Two chambers 161 in means 33 would then be provided to mate with the two key pins 185 at facing corresponding locations in endwall 187 of means 33. When three pins 185 are used and 3 round chambers 161 are provided in means 33, the possible permutations of pins 185 with chambers 183 is greatly increased. The number of codes for fluid provided in containers fitted with means 33 or 233 accordingly is greatly increased also.

The pins 185 preferably are press-fitted into key chambers 183 in means 35 so that they cannot be tampered with and removed to unapproved locations for use with an unapproved fluid provided in a container having a different permutation of pins and chambers.

However, in some cases it may be advantageous to use the same apparatus to spray atomized fluid for related applications in a use area. In such case, the pins 185 positioned for use with a first coded fluid container can be made with a slip fit, or provided with threads and threaded into key chambers 183, so that the pins can be removed and moved into different key chambers 183 to correspond to the key chambers of a second approved coded fluid provided with a coded fluid dispensing means 33 according to the invention.

While pins 185 preferably are cylindrical in shape, it is to be understood that the pins can also be provided in any shape, e.g. triangular, square, hexagonal and the like and used in any combination, e.g. one or more cylindrical pins with one or more square pins, and the like. The key chambers 161 can likewise be provided in the corresponding receptacle shape.

It is to be understood that the combination of chambers and key pins is a preferred coding or keying system, but that the invention is not limited to use of such a coding system. Other coding systems for mating means 33 with means 35 can be used. For example, inlet 135 and outlet 137 of means 33 and 35, respectively, can be of other than cylindrical or tubular shape, and can be, for example, rectangular, triangular, oval, serrated, or other shapes and sizes which will permit mating of only like male and female connecting parts. Also, the shoulder 213 and recess 211 can be made rectangular, triangular or other than round or circular and cap 199 can be shaped accordingly.

While the assembled coded fluid delivery means 29 is shown in FIGS. 1 and 4 to be located at the outlet of fluid container 27, it is to be understood that means 29 can also be advantageously used by affixing the mating parts, i.e. means 33 and means 35, in a fluid supply line, hose or tube or in a container, reservoir or other bulk storage means for transferring approved fluid from the storage means to a use container.

In some cases it will be advantageous to modify the means for connecting means 33 to the bulk storage means and connecting means 35 to a fluid receptacle means. For example, the resilient radial lip 133 of means 33 can be connected to a mating snap ring on a fluid supply hose and means 35 could be provided with a resilient gasket to fit around body 175 and to permit means 35 to be plugged into a corresponding inlet of a fluid receptacle.

Referring now to FIG. 1, and as earlier discussed, fluid sprayer apparatus according to the invention is provided with a timer and control means 45. While timer and control means 45 is shown in block form in FIG. 1, it is to be understood that such timer and control means are commercially available and need not be described in great detail and that suitable available timer and control means can be assembled to achieve the functions hereinafter described. In particular, the timer and control means 45, should enable the user of the fluid sprayer apparatus of this invention to program operation of the apparatus to perform the following three functions:

(1) control the duration of spraying or fogging time, defined as the length of time that the air blower 41 is in the "on" condition and the apparatus is delivering fog mist with aerosol sized particles, for example, 1 to 20 minutes of "on" time;

(2 ) control with a 24 hour period the frequency of a time period, or periods, during which fogging or spraying is to be carried on, thus permitting the user to regulate a cycle of periods of the day or night the user wishes to have the fogging or spraying operation to be conducted, for example, 1 to 20 times during a 24 hour period;

(3) control the sequence of 24 hour periods during which the apparatus is to be in operation or off, thus permitting the user to "skip-a day", that is, to select any combination of 24 hour periods during which the apparatus is to be left shut-down and to select 24 hour periods during which it is to be operated, for example, weekend operation can be eliminated.

The first function has the advantage of permitting the operator to adjust how long the apparatus will be performing the misting operation. Such a capability is extremely important in order that the user can control the duration of operation according to his peculiar needs, including size of area, ambient conditions, and purpose for which the fogging operation is being conducted.

The second timing function, i.e. hour of the day, is also very important. A user may want to control an insect, odor or germ problem at certain hours of the day during which the problem is greatest. Further, it might be desired to have the fogging operation conducted when no human beings are present either because it would be annoying to customer, workers, or others, or dangerous to the fogging machine operator. In areas such as restaurants, bakeries and food processing plants, the user will not want chemical products to be injected into the atmosphere, or at such times as customers or workers are present. Further, he would not want the chemicals or dead insects falling onto edible food products or into processing equipment.

This second function is extremely important as compared to a synchronized aerosol time release device which sprays chemicals at regular intervals into the air in areas such as restaurants causing an annoying odor to customers, potentially permitting the chemicals to fall on food as well as to permit insects to fall into food and on utensils. It is anticipated that in the near future Health Inspectors will limit or substantially reduce the use of such devices. Currently, in areas such as restaurants, such units can be used only in doorways or corridor areas. However, by so limiting the use, the effectiveness of the products are limited as well as still presenting the hazard of chemical and insect contamination as described.

The third function, the skip-a-day or omitting day function, is particularly beneficial. There are certain times of the year or conditions which might either require frequent or less frequent misting of chemical products to control insects, odors or germs.

Another important advantage of using the time controlled mist fog generator, i.e. the fluid sprayer apparatus of this invention, as opposed to a known time release aerosol is the range of coverage. The range of the fluid sprayer apparatus as described herein can be 200 feet or more. The time release aerosol devices, depending on size, range from about 15 to 20 feet for the small unit to about 40 to 50 feet for larger units.

The timer and control means 45 can be provided as a combination of three individual clock and switch devices, each of which performs one of the three functions described above and which together serve to perform all the functions as necessary. Preferably, all the timing and switching functions are integrated into a single programmable time-switch mechanism. The timer and control means 45 can be actuated by suitable electromechanical or electronic means.

The fluid sprayer apparatus of this invention will generally be used from a fixed position, whether wall mounted, hung from a ceiling, or placed in a selected position as a portable unit. The unit can be positioned to cover as many different directions as possible for complete coverage and to overcome different room configurations and room barriers. By utilizing two fog heads, two different directions can be sprayed from a single unit at the same time. Further, this enables fogging two different liquid products from the same unit at the same time. For example, the tee 23 can be disconnected from fluid conduit lines 19, 21 and 25. Line 19 can then be directly connected to line 25 to conduct fluid from container 27 to spray nozzle 11. This fluid could, for example, be an insecticide. Fluid conduit line 21 can be connected to a second fluid container by means of suitable fluid conduit line to conduct fluid from the second container to spray nozzle 13. The second fluid could be, for example, a deodorant. The second container of fluid can be mounted to the outside of the case 1 or adjacent thereto. By using the preceding embodiment, one fog head and supply line can be used to dispense the deodorant while at the same time the other fog head and supply line can be used to dispense the insecticide. Each fog head can be independently changed as to direction of fogging in both horizontal and vertical planes. The system of using two L-shaped elbow connections, e.g. 89 and 93, as shown in FIGS. 1 and 2, helps to achieve this capability. Further, utilization of the sleeve 83 within tube 75 permits the turning motion for horizontal direction. The use of a plastic rubber compression washer 73 permits proper air seal while permitting the sleeve 83 to twist or turn. Extensions of the fog heads 7 and 9 can be used with either rigid parts or flexible hoses to permit introducing a fog into an air duct on the exhaust side of an air conditioning system, or around, or through a wall, or other barrier to gain access to another area to be fogged or sprayed.

While the fluid sprayer apparatus of this invention has been generally described in its use as a sprayer or fogger for dispensing an insecticide or a deodorant, the apparatus will be advantageous and beneficial when used in many other areas, for example in food processing operations, bottling plants, restaurants, dairy barns, supermarkets, institutions, sanitation plants, hospitals, schools, recreational areas, hotels, motels, homes, poultry farms, livestock areas, granaries, stables, kennels, storage facilities, greenhouses, tobacco houses, veterinaries, garbage areas, industrial plants, apartments, locker rooms, garages, vehicles, such as aircraft, buses, trains, and sea-going vessels, and many more areas wherever insects, odors or germs require attention.

The method of using the fluid sprayer apparatus of the invention to spray a selected approved fluid from a container 27 fitted with a vented coded fluid outlet and dispensing means 33 according to this invention will be understood by those skilled in the spraying art and need not be described in detail. In general, the cap 199 will be removed from means 233 by rupturing hinge strap 201 and pulling the cap off means 233. The container 27 of fluid is then inverted. The ball of ball check valve 157 drops down to seat against inlet 158 to air chamber 155 to prevent leakage of fluid into chambers 153, 152 and air vent 151. Inlet 135 is inserted over outlet 137 of means 35, guide pad 209 is matched with opening 215 of means 35 and means 33 is lowered onto means 35, bringing endwalls 187 and 189 into abuttment and seating shoulder 213 into recess 211. Pins 185 seat into mating key chambers 161 of means 33. Th projecting wall 169 of outlet 135 is forced outwardly by shoulder 171, forming a fluid-tight seal around inlet 137. Ball 145 of means 33 is forced upwardly against spring 147, compressing the spring and lifting ball 145 away from its seat against wall 141 and inlet 135. Ball 145 rests on the castellations 123 of inlet 137. The container 27 is now in condition for dispensing its fluid.

The timer and control mechanisms are set to conditions for the duration and frequency and skip-time cycles desired. To dispense the fluid from container 27, the timer and control means 45 are energized by turning on the electricity to line 55. Upon activation by the timer and control means 45, motor 41b of blower 41 drives fan 41c to provide a flow of air into spray nozzle means 3 and 7. The air flowing from the openings in the spray heads causes air to be aspirated through nozzles 11 and 13 creating a vacuum, drawing fluid through fluid conduit line 25 and fluid conduit lines 19 and 21 from container 27. The turbulence of the air around nozzles 11 and 13 atomizes the fluid in a known way. The spray or fog of atomized fluid is directed in desired directions by adjusting the spray nozzle means 3 and 5 accordingly to treat a desired area with the fluid.

The fluid will usually be a solution of an active agent in an organic solvent or water. However, the fluid can also be a dispersion or emulsion of finely-divided particles, such as "wettable" powders provided for insecticides or similar uses.

The invention has been described in detail with particular reference to the preferred embodiments thereof, but it will be understood that variations and modifications can be affected within the spirit and scope of the invention as described hereinafter and as defined in the appended claims.

What is claimed:

1. In a fluid sprayer apparatus including a selected fluid for spraying therewith, a container for said selected fluid, a fluid supply means associated with said container and said apparatus and comprising in combination a coded fluid inlet and dispensing means having means for attachment to spraying means of said apparatus and having attachment means for attaching the inlet of said coded means to the outlet of a vented companion coded fluid outlet and dispensing means having means for attaching said companion coded means to a container of said fluid characterized in that said fluid inlet and dispensing means and said companion coded fluid outlet and dispensing means each comprises a tubular body with an endwall having a multiplicity of elongated key chambers, said endwalls being opposed and said key chambers in each endwall having locations corresponding to those of key chambers in the opposing endwall with at least two of said chambers being selected mating key chambers and having key pins fitted therein to engage corresponding mating key chambers in the opposing endwall in accordance with a code associated with a selected fluid to be sprayed from said fluid sprayer apparatus and provided in said container.

2. A fluid sprayer apparatus for use with a selected fluid comprising a fluid container, a fluid supply means associated with said container and said apparatus and comprising in combination a coded fluid inlet and dispensing means having means for attachment to spraying means of said apparatus and having attachment means for attaching the inlet of said coded means to the outlet of a vented companion coded fluid outlet and dispensing means having means for attaching said companion coded means to a fluid container, said coded fluid inlet and dispensing means comprises:

(i) a tubular upper body having an endwall,
(ii) a support for said body,
(iii) an elongated tubular fluid receiving inlet having an inner wall and an outer wall and a castellated inlet end, said inlet extending outwardly from the endwall of the body and parallel to the axis thereof, (iv) an elongated tubular fluid outlet having its axis parallel to the axis thereof, and including at its inlet end a spherical inner wall surface which merges with the inner wall of inlet (iii), (v) a multiplicity of elongated key chambers radially located in the endwall of the body around the axis of and within the body and corresponding in location to key chambers in said coded fluid outlet and dispensing means, at least two of said chambers being mating key chambers, and (vi) a multiplicity of elongated key pins, said key pins being fitted only in said mating key chambers, said pins extending outwardly from said endwall for a distance sufficient to fit into a mating key chamber of said companion coded fluid outlet and dispensing means, and wherein said vented companion coded fluid outlet and dispensing means comprises:

(vii) a tubular body having a lower endwall having a multiplicity of elongated key chambers radially located in said endwall around the axis and within the body and corresponding in location to said key chambers in said coded fluid inlet and dispensing means, at least two of said chambers being mating key chambers corresponding to said mating key chambers of said inlet means fitted with key pins, (viii) container latching means associated with the upper part of said body (vii), (ix) a fluid dispensing outlet in said body (vii) adapted to receive and retain in fluid-tight engagement said inlet (iii), said outlet having an inlet end which merges with the wall of an open-ended fluid inlet chamber located adjacent to the upper endwall of body (vii), said chamber including a ball check valve and having a spring disposed between the ball check valve and the inlet of said chamber, (x) air vent means in said body, said vent means having an inlet in a side wall of said body (vii) and an outlet in the endwall of the upper part of said body (vii), (xi) said key pins (vi) being adapted to fit only in said mating key chambers of said body (vii), and wherein the location of said mating key chambers is determined in accordance with a code associated with fluid to be sprayed from said fluid sprayer apparatus.

3. A fluid sprayer apparatus according to claim 2 wherein said outlet (iv) includes (xii) a ball check valve.

4. A fluid sprayer apparatus according to claim 3 wherein said outlet (iv) includes (xiii) an elongated tubular connector having a castellated inlet end and is inserted into said outlet (iv) and supports said ball check valve (xii).

5. A fluid sprayer apparatus according to claim 2 wherein said air vent means (x) includes check valve means for preventing fluid escape through said means (x).

6. A fluid sprayer apparatus according to claim 5 wherein said check valve means is a ball check valve means.

7. A fluid sprayer apparatus according to claim 2 wherein said coded fluid inlet and dispensing means includes from 2 to 12 key chambers and said coded fluid outlet and dispensing means includes from 2 to 12 key chambers.

8. A fluid sprayer apparatus according to claim 2 wherein said coded fluid inlet and dispensing means includes from 2 to 3 key pins in 3 chambers.

9. A fluid sprayer apparatus according to claim 2 wherein said fluid outlet (ix) and said fluid receiving inlet (iii) are of non-cylindrical shape and are used to mate means 33 and 35 in a keyed coded position.

10. A fluid sprayer apparatus according to claim 2 wherein said coded fluid inlet and dispensing means includes from 3 to 12 key chambers, three of said chambers being selected as mating key chambers, in accordance with a code for the fluid to be sprayed, a key pin in each of said mating key chambers, and wherein said coded fluid outlet and dispensing means includes only three key chambers each of which is a mating key chamber for mating with a corresponding key pin.

11. A fluid sprayer apparatus according to claim 2 wherein said coded fluid outlet and dispensing means includes:

(xiv) a cap, said cap comprising (xv) a substantially flat-ended, round, resilient body, (xvi) a pair of resilient plugs attached to one flat surface of said body, one of said plugs being adapted to fit sealingly into the fluid dispensing outlet of body (vii) and the other plug being adapted to fit into an outlet of air vent means (x) in the lower end of said body (vii), and (xvii) a rupturable taut strap extending from the outer wall of said body (vii) to the outer edge of the body of the cap, said strap being at least long enough to permit said plugs to be fitted into said outlets for capping said coded fluid outlet and dispensing means when said latter means is separate from the coded fluid inlet and dispensing means.

12. A fluid sprayer apparatus according to claim 11 wherein said coded fluid outlet and dispensing means includes (xix) a locking means extending from the endwall of body (vii) for retaining said cap in childproof condition.

13. A fluid sprayer apparatus according to claim 11 wherein said coded fluid outlet and dispensing means includes (xix) a locking means extending from the endwall of body (vii) for retaining said cap in tamperproof condition.

14. A fluid sprayer apparatus according to claims 12 or 13 wherein said strap is of a length sufficient to provide a tab for removing said cap from said coded fluid outlet and dispensing means after rupturing the strap.

15. A fluid sprayer apparatus according to claim 2 including:

(a) at least one horizontally, vertically and axially adjustable spray head including a metered spray nozzle, (b) fluid conduit means connecting said fluid supply means with the said spray head, (c) air supply means for supplying air to said spray head for atomizing and spraying fluid flowing from said fluid supply means to said spray nozzle, and (d) programmable timer and control means for scheduling and automatically actuating said air supply means for frequency and duration of time of supplying air to said spray head thereby controlling frequency of operation of said apparatus for spraying selected amounts of fluid, said programmable timer and control means including (i) means for timing and controlling the length of time the air supply means is on for spraying fluid, thereby regulating the duration of spraying, (ii) means for timing and controlling periods of time within a 24 hour period during which said air supply means is on for spraying purposes, thereby regulating the frequency of spraying, and (iii) means for timing and controlling periods of time greater than a 24 hour period during which said air supply means is to be left shut-down between spraying periods other than at a 24 hour frequency.

16. A fluid sprayer apparatus according to claim 12 wherein said locking means is a coded locking means mating with a companion coded locking means on the endwall of body (i).

17. A method for controlling dispensing of a selected fluid into a use area from a fluid sprayer apparatus comprising restricting use of the apparatus to fluid approved for use in the use area by supplying approved fluid in a container having a vented coded fluid outlet and dispensing means including keying means adapted to mate with keying means of a companion coded fluid inlet and dispensing means associated with a fluid conduit line connected with a nozzle of the spray head of said apparatus, and connecting said coded fluid outlet and dispensing means of said container to the coded fluid and dispensing means associated with said fluid conduit line prior to dispensing said fluid characterized in that said keying means are provided by supplying each of said inlet and dispensing means and said coded fluid outlet and dispensing means in the form of a tubular body each having a mating endwall having a multiplicity of elongated key chambers locating said key chambers in each endwall in locations corresponding to those of key chambers in the mating endwall, selecting at least two of said chambers as mating key chambers and fitting elongated key pins therein in accordance with a code associated with a selected fluid to be sprayed from said fluid sprayer apparatus and provided in said container.

18. A method for controlling dispensing of a selected fluid into a use area from a fluid sprayer apparatus comprising restricting use of the apparatus to fluid approved for use in the use area by supplying approved fluid in a container having a vented coded fluid outlet and dispensing means including first keying means adapted to mate with second keying means of a companion coded fluid inlet and dispensing means associated with a fluid conduit line connected with a nozzle of the spray head of said apparatus, and connecting said coded fluid outlet and dispensing means of said container to the coded fluid and dispensing means associated with said fluid conduit line prior to dispensing said fluid, said first keying means including:

(i) a tubular upper body having an endwall,
(ii) a support for said body,
(iii) an elongated tubular fluid receiving inlet having an inner wall and an outer wall and a castellated inlet end, said inlet extending outwardly from the endwall of the body and parallel to the axis thereof,
(iv) an elongated tubular fluid outlet having its axis parallel to the axis thereof, and including at its inlet end a spherical inner wall surface which merges with the inner wall of inlet (iii),
(v) a multiplicity of elongated key chambers radially located in the endwall of the body around the axis of and within the body and corresponding in location to key chambers in said coded fluid outlet and dispensing means, at least two of said chambers being mating key chambers, and
(vi) a multiplicity of elongated key pins, said key pins being fitted only in said mating key chambers, said pins extending outwardly from said endwall for a distance sufficient to fit into a mating key chamber of said companion coded fluid outlet and dispensing means, and said second keying means including:

(vii) a tubular body having a lower endwall having a multiplicity of elongated key chambers radially located in said endwall around the axis and within the body and corresponding in location to said key chambers in said coded fluid inlet and dispensing means, at least two of said chambers being mating key chambers corresponding to said mating key chambers of said inlet means fitted with key pins,
(viii) container latching means associated with the upper part of said body (vii),
(ix) a fluid dispensing outlet in said body (vii) adapted to receive and retain in fluid-tight engagement said inlet (iii), said outlet having an inlet end which merges with the wall of an open-ended fluid inlet chamber located adjacent to the upper endwall of body (vii), said chamber including a ball check valve and having a spring disposed between the ball check valve and the inlet of said chamber,
(x) air vent means in said body, said vent means having an inlet in a side wall of said body (vii) and an outlet in the endwall of the upper part of said body (vii),
(xi) said key pins (vi) being adapted to fit only in said mating key chambers of said body (vii), and wherein the location of said mating key chambers is determined in accordance with a code associated with said selected fluid to be sprayed from said fluid sprayer apparatus.

19. The method according to claim 18 wherein said outlet (iv) includes (xii) a ball check valve.

20. The method according to claim 19 wherein said outlet (iv) includes (xiii) an elongated tubular connector having a castellated inlet end and is inserted into said outlet (iv) and supports said ball check valve (xii).

21. The method according to claim 18 wherein said air vent means (x) includes check valve means for preventing fluid escape through said means (x).

22. The method according to claim 21 wherein said check valve means is a ball check valve means.

23. The method according to claim 18 wherein said coded fluid inlet and dispensing means includes from 2 to 12 key chambers.

24. The method according to claim 18 wherein said coded fluid inlet and dispensing means includes from 2 to 11 key pins.

25. The method according to claim 18 wherein said coded fluid outlet and dispensing means includes from 2 to 12 key chambers.

26. The method according to claim 18 wherein said vented coded fluid inlet and dispensing means includes from 3 to 12 key chambers, three of said chambers being selected as mating key chambers, in accordance with a code for the fluid to be sprayed a key pin in each of said mating key chambers, and wherein said coded fluid outlet and dispensing means includes only three key chambers each of which is a mating key chamber for mating with a corresponding key pin.

27. The method according to claim 18 wherein said vented coded fluit outlet and dispensing means includes
(xiv) a cap, said cap comprising
(xv) a substantially flat-ended, round, resilient body,
(xvi) a pair of resilient plugs attached to one flat surface of said body, one of said plugs being adapted to fit sealingly into the fluid dispensing outlet of body (vii) and the other plugs being adapted to fit into an outlet of air vent means (x) in the lower end of said body (vii), and (xvii) a rupturable taut strap extending from the outer wall of said body (vii) to the outer edge of the body of the cap, said strap being at least long enough to permit said plugs to be fitted into said outlets for capping said coded fluid outlet and dispensing means when said latter means is separate from the coded fluid inlet and dispensing means.

28. The method according to claim 27 wherein said vented coded fluid outlet and dispensing means includes (xix) a locking means extending from the endwall of body (vii) for retaining said cap in childproof condition.

29. The method according to claim 27 wherein said vented coded fluid outlet and dispensing means includes (xix) a locking means extending from the endwall of body (vii) for retaining said cap in tamperproof condition.

30. The method according to claims 28 or 29 wherein said strap is of a length sufficient to provide a tab for removing said cap from said coded fluid outlet and dispensing means after rupturing the strap.

31. The method according to claim 18 including providing an air supply means for dispensing said fluid, the improvement comprising dispensing said selected fluid automatically on a programmed schedule, said dispensing comprising actuating said air supply means with a combination of timer and control means
(a) for a controlled duration of time,
(b) for a selected frequency of actuations during a 24-hour period, and
(c) at a selected frequency of actuations during periods of time greater than a 24 hour period.

32. A method according to 31 wherein said apparatus comprises in combination
(a) said fluid supply means,
(b) at least two horizontally, vertically and axially adjustable spray heads including metered spray nozzles,
(c) fluid conduit means connecting the supply means with the spray heads,
(d) air supply means for supplying air to said spray heads for atomizing and spraying fluid flowing from said fluid supply means to said spray nozzles, and wherein
said dispensing comprises adjusting said adjustable spray heads to disperse spray from said spray nozzles simultaneously in at least two different directions.

33. In combination, a container of fluid and a coded fluid outlet and dispensing means and closure for a container which comprises:
(i) a tubular body having a cappable endwall having a multiplicity of elongated key chambers radially located in said endwall around the axis and within the body and corresponding in location to a code associated with said fluid, at least two of said chambers being mating key chambers corresponding to mating key chambers of an inlet means of a mating coded fluid inlet and dispensing means fitted with key pins,
(ii) container latching means associated with a container outlet-fitting part of said body (i),
(iii) a fluid dispensing outlet in said body adapted to receive and retain in fluid-tight engagement said inlet means, said outlet having an inlet end which merges with the wall of an open-ended fluid inlet chamber located adjacent to the endwall of said container outlet-fitting part of said body (i), said chamber including a ball check valve and having a spring disposed between the ball check valve and the inlet of said chamber,
(iv) air vent means in said body (i), said vent means having an inlet in a side wall of said body (i) and an outlet in said endwall of said container outlet-fitting part of said body (i),
(v) a cap, said cap comprising
(vi) a substantially flat-ended, round, resilient body,
(vii) a pair of resilient plugs attached to one flat surface of said body, one of said plugs being adapted to fit sealingly into the fluid dispensing outlet of body (vii) and the other plug being adapted to fit into an outlet of air vent means (x) in the lower end of said body (vii), and
(viii) a rupturable taut strap extending from the outer wall of said body (vii) to the outer edge of the body of the cap, said strap being at least long enough to permit said plugs to be fitted into said outlets for capping said coded fluid outlet and dispensing means when said latter means is separate from the coded fluid inlet and dispensing means.

34. A fluid supply means according to claim 33 wherein said coded fluid outlet and dispensing means includes (ix) a locking means extending from the endwall of body (i) for retaining said cap in childproof condition.

35. A fluid supply means according to claim 33 wherein said coded fluid outlet and dispensing means includes (ix) a locking means extending from the endwall of body (i) for retaining said cap in tamperproof condition.

36. A fluid supply means according to claims 34 and 35 wherein said strap is of a length sufficient to provide a tab for removing said cap from said coded fluid outlet and dispensing means after rupturing the strap.

37. A fluid supply means according to claim 33 wherein said air vent means (iv) includes check valve means for preventing fluid escape through said air vent means (x).

38. A fluid supply means according to claim 37 wherein said check valve means is a ball check valve means.

39. A fluid sprayer apparatus comprising:
(a) a fluid conduit having an inlet end;
(b) an inlet coupling connected to said inlet end of said conduit; and
(c) said inlet coupling including a fluid passageway in fluid communication with said conduit and also including coded coupling means for matingly coupling said inlet coupling only to a companion-coded outlet coupling said coded coupling means including means for changing the code from one code to a second different code;
wherein said fluid conduit includes an outlet end, and a fluid spray head connected to said outlet end of said conduit, said fluid spray head including means for universally adjusting the direction of fluid spray therefrom, means for forcing a fluid spray from said spray head, and automatic timing means for controlling the timing of the fluid spray from said spray head.

40. The fluid sprayer apparatus as recited in claim 39 including a fluid source having an outlet end; an outlet coupling connected to said outlet end and in mating engagement with said inlet coupling, said outlet coupling including a fluid passageway in fluid communication with said fluid passageway in said inlet coupling, and said outlet coupling including coded coupling means for matingly coupling said outlet coupling only to a companion-coded inlet coupling, said coded coupling means of said outlet coupling being companion-coded to said coded coupling means of said inlet coupling.

41. A fluid sprayer apparatus comprising:
(a) a fluid conduit having an inlet end;
(b) an inlet coupling connected to said inlet end of said conduit;
(c) said inlet coupling including a fluid passageway in fluid communication with said conduit and also including coded coupling means for matingly coupling said inlet coupling only to a companion coded outlet coupling, whereby said fluid sprayer apparatus can only be connected to a source of selected fluid having a companion-coded outlet coupling; and
(d) said coded coupling means including a plurality of axially extending key chambers and including at least one key pin in at least one of said key chambers and extending axially outwardly therefrom, the number of key pins being less than the number of key chambers, whereby said coded coupling means can be provided with any one of a plurality of different codes;
wherein said fluid sprayer apparatus includes a fluid source having an outlet end; an outlet coupling connected to said outlet end and in mating engagement with said inlet coupling, said outlet coupling including a fluid passageway in fluid communication with said fluid passageway in said inlet coupling, and said outlet coupling including coded coupling means for matingly coupling said outlet coupling only to a companion-coded inlet coupling, said coded coupling means of said outlet coupling being companion coded to said coded coupling means of said inlet coupling.

42. A method for ensuring that a selected fluid is sprayed by a fluid sprayer apparatus comprising:
(a) providing a container of said selected fluid with an outlet coupling having a coded outlet coupling means for allowing said container to matingly couple only with a companion coded inlet coupling means;
(b) providing a fluid sprayer apparatus with an inlet coupling having a companion coded inlet coupling means for allowing said fluid sprayer apparatus to matingly couple only with a companion coded outlet coupling means; and
(c) adjusting the code of said inlet coupling means to be a companion code to that of said outlet coupling means.

43. The method as recited in claim 42 including providing said outlet coupling means with a single permanent code.

44. The method as recited in claim 43 including providing said inlet coupling means with a plurality of different possible codes and wherein said adjusting step comprises selecting one of said different possible codes.

45. The method as recited in claim 44 including making said selecting code permanent.

46. The method as recited in claim 42 including capping said container with a rupturable cap that ruptures when said cap is first removed from said container, whereby it can be determined by looking at said cap whether or not said fluid of said container could have been tampered with subsequent to capping.

47. The method as recited in claim 46 including providing said outlet coupling means with a single permanent code.

48. The method as recited in claim 47 including providing said inlet coupling means with a plurality of different possible codes and wherein said adjusting step comprises selecting one of said different possible codes.

49. A fluid sprayer apparatus comprising:
(a) a fluid conduit having an inlet end;
(b) an inlet coupling means connected to said inlet end of said conduit for attaching said conduit in fluid communication with a source of fluid; and
(c) said inlet coupling means including a first passageway in fluid communication with said conduit and also including adjustable coded coupling means for matingly coupling said inlet coupling only to a companion-coded outlet coupling said coded coupling means including means for changing the code from one code to a second different code, whereby said fluid sprayer apparatus can be coupled only to a selected fluid source having a companion-coded outlet coupling;
wherein said fluid conduit includes an outlet end, and a fluid spray head connected to said outlet end of said conduit, said fluid spray head including means for universally adjusting the direction of fluid spray therefrom, means for forcing a fluid spray from said spray head, and automatic timing means for controlling the timing of the fluid spray from said spray head.

50. A fluid sprayer apparatus comprising:
(a) a fluid conduit having an inlet end;
(b) an inlet coupling connected to said inlet end of said conduit; and
(c) said inlet coupling including a fluid passageway in fluid communication with said conduit and also including coded coupling means for matingly coupling said inlet coupling only to a companion-coded outlet coupling, said coded coupling means including means for providing a large number of different possible codes and said coded coupling means having one pre-determined code selected from said large number of possible codes;
wherein said fluid conduit includes an outlet end, and a fluid spray head connected to said outlet end of said conduit, said fluid spray head including means for universally adjusting the direction of fluid spray therefrom, means for forcing a fluid spray from said spray head, and automatic timing means for controlling the timing of the fluid spray from said spray head.

51. A fluid sprayer apparatus comprising:
(a) a fluid conduit having an inlet end;
(b) an inlet coupling connected to said inlet end of said conduit;
(c) said inlet coupling including a fluid passageway in fluid communication with said conduit and also including coded coupling means for matingly coupling said inlet coupling only to a companion-coded outlet coupling, said coded coupling means including means for providing a large number of different codes and said coded coupling means having one pre-determined code selected from said large number of possible codes, said one pre-determined code being a permanent code for said inlet coupling;
wherein said fluid conduit includes an outlet end, and a fluid spray head connected to said outlet end of said conduit, said fluid spray head including means for universally adjusting the direction of fluid spray therefrom, means for forcing a fluid spray from said spray head, and automatic timing means for controlling the timing of the fluid spray from said spray head.

52. A fluid sprayer apparatus comprising:
    (a) a fluid conduit having an inlet end;
    (b) an inlet coupling connected to said inlet end of said conduit;
    (c) said inlet coupling including a fluid passageway in fluid communication with said conduit and also including coded coupling means for matingly coupling said inlet coupling only to a companion-coded outlet coupling, whereby said fluid sprayer apparatus can only be connected to a source of selected fluid having a companion coded outlet coupling; and
    (d) said coded coupling means including at least one axially extending key chamber and including at least one key pin in one of said key chambers and extending axially outwardly therefrom;
wherein said fluid conduit includes an outlet end, and a fluid spray head connected to said outlet end of said conduit, said fluid spray head including means for universally adjusting the direction of fluid spray therefrom, means for forcing a fluid spray from said spray head, and automatic timing means for controlling the timing of the fluid spray from said spray head.

53. A fluid sprayer apparatus comprising:
    (a) a fluid conduit having an inlet end;
    (b) an inlet coupling connected to said inlet end of said conduit;
    (c) said inlet coupling including a fluid passageway in fluid communication with said conduit and also including coded coupling means for matingly coupling said inlet coupling only to a companion-coded outlet coupling, whereby said fluid sprayer apparatus can only be connected to a source of selected fluid having a companion-coded outlet coupling; and
    (d) said coded coupling means including a plurality of axially extending key chambers and including at least one key pin in at least one of said key chambers and extending axially outwardly therefrom the number of key pins being less than the number of key chambers, whereby said coded coupling means can be provided with any one of a plurality of different codes;
wherein said fluid conduit includes an outlet end, and a fluid spray head connected to said outlet end of said conduit, said fluid spray head including means for universally adjusting the direction of fluid spray therefrom, means for forcing a fluid spray from said spray head, and automatic timing means for controlling the timing of the fluid spray from said spray head.

* * * * *

UNITED STATES PATENT AND TRADEMARK OFFICE
CERTIFICATE OF CORRECTION

PATENT NO. : 4,272,019
DATED : June 9, 1981
INVENTOR(S) : Samuel A. Halaby, Jr.

It is certified that error appears in the above—identified patent and that said Letters Patent is hereby corrected as shown below:

Claim 32, line 1, after "to" insert ---claim---.

Signed and Sealed this

Eighteenth Day of August 1981

[SEAL]

Attest:

GERALD J. MOSSINGHOFF

Attesting Officer

Commissioner of Patents and Trademarks